Figure 1:
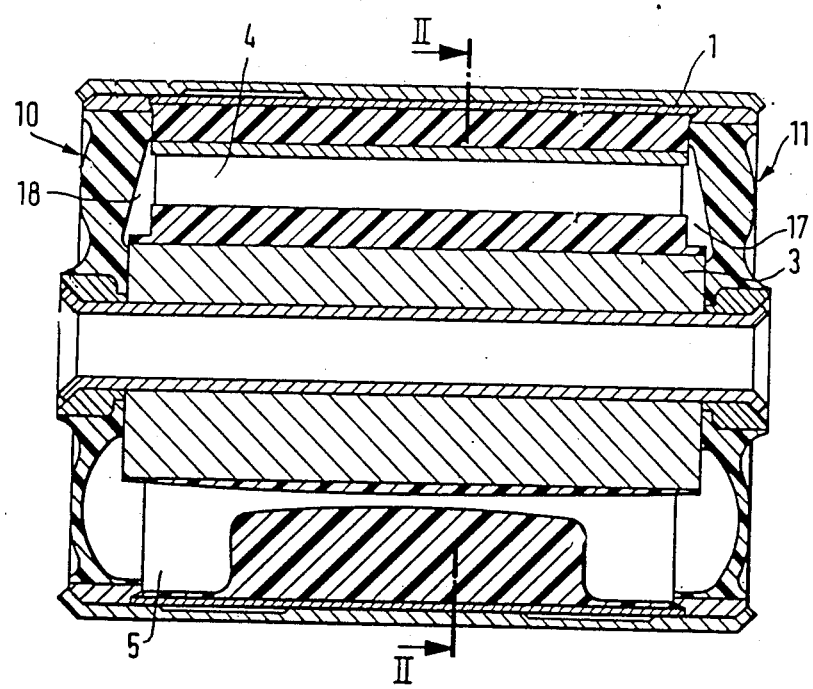

United States Patent [19]

Bitschkus et al.

[11] Patent Number: 4,667,942
[45] Date of Patent: May 26, 1987

[54] PRETENSIONABLE AND HYDRAULICALLY DAMPED MOUNTING ELEMENT

[75] Inventors: Horst Bitschkus, Hilgert; Manfred Hofmann, Hünfelden; Uwe Nelles, Bonn, all of Fed. Rep. of Germany

[73] Assignee: Metzeler Kautschuk GmbH, Munich, Fed. Rep. of Germany

[21] Appl. No.: 854,127

[22] Filed: Apr. 21, 1986

[30] Foreign Application Priority Data

Feb. 19, 1986 [DE] Fed. Rep. of Germany ....... 3605305

[51] Int. Cl.$^4$ .............................................. F16F 3/00
[52] U.S. Cl. .................................. 267/140.1; 267/121
[58] Field of Search ................ 248/562; 267/35, 118, 267/121, 122, 140.1, 151

[56] References Cited

U.S. PATENT DOCUMENTS 3,642,268  2/1972  Hipsher ........................ 267/140.1 X
3,888,449  6/1975  Jablonski et al. ................ 267/140.1
4,005,858  2/1977  Lochner ........................ 267/140.1 X Primary Examiner—Duane A. Reger
Attorney, Agent, or Firm—Herbert L. Lerner; Laurence A. Greenberg

[57] ABSTRACT

A pretensionable and hydraulically damped mounting element with an outer mounting sleeve, an inner part, which is held by an elastomeric body in the interior of the outer mounting sleeve, the elastomeric body above and below the inner part being formed with chambers serving as a mechanical spring and being filled with hydraulic fluid and connected to one another via a channel, and end caps located at respective end faces of the mounting element and being formed of elastic, deformable elastomeric material, the elastomeric body extending from the inner part substantially radially outwardly towards opposite sides of the outer mounting sleeve, the elastomeric body and at least one of the end caps defining the channel therebetween, the channel having a variable cross section includes means defining axially extending additional chambers arranged at both sides of the inner part of the elastomer body, the additional chambers communicating with the channel.

1 Claim, 2 Drawing Figures

PRETENSIONABLE AND HYDRAULICALLY DAMPED MOUNTING ELEMENT

The invention relates to a pretensionable and hydraulically damped mounting element with an outer mounting sleeve, and an inner part held by an elastomeric body in the interior of the outer mounting sleeve, the elastomeric body above and below this inner part being formed with chambers serving as a mechanical spring, and being filled with an hydraulic fluid, and connected to one another via a channel, end caps located at respective end faces of the mounting element and being formed of elastic, deformable elastomeric material, the elastomeric body extending from the inner part substantially radially outwardly towards opposite sides of the outer mounting sleeve, the elastomeric body and at least one of the end caps defining the channel therebetween at one of the end faces, the channel having a varying cross section, in accordance with Application Ser. No. 854,124 filed simultaneously with the instant application and assigned to the same corporate assignee as that of the instant application.

Due to this construction of the end caps formed of an elastically deformable material and applied to the end faces of the mounting element, these caps expand and bulge out differently depending upon the loading or compressive stroke of the mounting element and the magnitude of the then occurring amplitudes, respectively, so that a different channel cross section with respect to the inner elastomeric body is produced and, accordingly, the damping can be adjusted to varying magnitudes, depending upon the respectively occurring amplitude. A broad band reduction of the dynamic stiffness in the acoustic frequency range is also thereby afforded.

With this bearing element, however, damping occurs only in vertical direction when it is loaded and vibrated, respectively. Because vibrations can also occur in horizontal direction with such bearing elements, it is accordingly advantageous and necessary to effect damping in that direction as well.

It is accordingly an object of the invention to provide such a bearing element which provides damping in horizontal direction.

With the foregoing and other objects in view, there is provided, in accordance with the invention, a pretensionable and hydraulically damped mounting element with an outer mounting sleeve, an inner part, which is held by an elastomeric body in the interior of the outer mounting sleeve, the elastomeric body above and below the inner part being formed with chambers serving as a mechanical spring and being filled with hydraulic fluid and connected to one another via a channel, and end caps located at respective end faces of the mounting element and being formed of elastic, deformable elastomeric material, the elastomeric body extending from the inner part substantially radially outwardly towards opposite sides of the outer mounting sleeve, the elastomeric body and at least one of the end caps defining the channel therebetween, the channel having a variable cross section, comprising means defining axially extending additional chambers arranged at both sides of the inner part of the elastomer body, the additional chambers communicating with the channel.

Other features which are considered as characteristic for the invention are set forth in the appended claims.

Although the invention is illustrated and described herein as embodied in a pretensionable and hydraulically damped mounting element, it is nevertheless not intended to be limited to the details shown, since various modifications and structural changes may be made therein without departing from the spirit of the invention and within the scope and range of equivalents of the claims.

Figure 2:
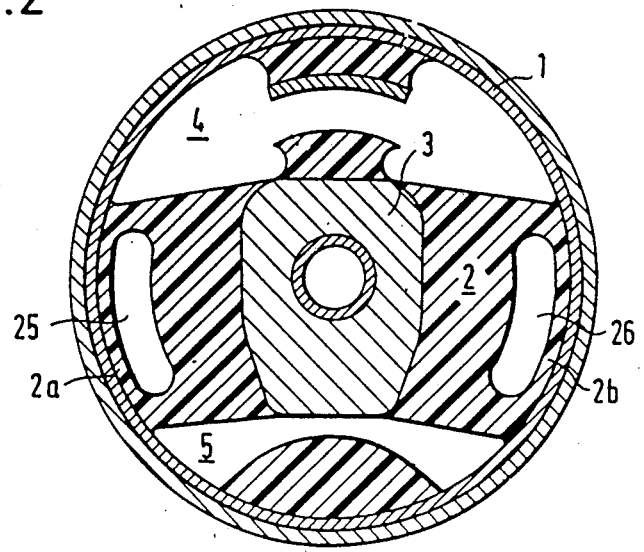

The construction and method of operation of the invention, however, together with additional objects and advantages thereof will be best understood from the following description of specific embodiments when read in connection with the accompanying drawings, in which:

FIG. 1 is a longitudinal sectional view, taken along a vertical plane, through the mounting element according to the invention; and FIG. 2 is a cross-sectional view of FIG. 1 taken along the section line II—II in the direction of the arrows;

Referring now to the figures of the drawing there is shown a mounting element according to the invention which is formed of a mounting sleeve 1 into which an elastomeric body 2 is vulcanized. This elastomer body 2 is formed of radially inclined rubber support arms 2a and 2b carrying in the middle therebetween an inner mounting or bearing bushing 3. The rubber arms 2a and 2b define an upper hollow chamber 4 and a lower hollow chamber 5 within the mounting sleeve 1.

In addition, an axially extending chamber 25 is provided, such as by machining the rubber arm 2a, and a similar axially extending chamber 26 in the rubber arm 2b. These chambers 25 and 26 can have the form of circular ring-shaped segments, or can also be kidney-shaped.

By means of the end caps 10 and 11 of elastomeric material, as is apparent from FIG. 1, an hydraulic connection of the vertically superimposed chambers 4 and 5, and also of the two chambers 25 and 26 disposed horizontally to one another is formed through annular channels 17 and 18.

For a corresponding vertical loading of the mounting element and due to the vibrations introduced therein, respectively, fluid or liquid from the upper chamber 4 is displaced into the lower chamber 5 and vice versa through the channels 17 and 18, respectively, whereas, for an horizontal loading and corresponding vibrations, fluid or liquid is displaced through these channels 17 and 18 from the chamber 25 into the chamber 26 and vice versa. Additional damping is accordingly effected by flow resistance of the overflow channels 17 and 18.

With the aforedescribed construction of the mounting element according to the invention, it is also possible to achieve damping of both vertical as well as horizontal vibrations whereby, especially due to suitable configuration of the end-face caps 10 and 11, a broad band reduction of the dynamic stiffness of the mount in the acoustic frequency range is possible.

The foregoing is a description corresponding in substance to German Application No. P 36 05 305.8, dated Feb. 19, 1985, the International priority of which is being claimed for the instant application, and which is hereby made part of this application. Any material discrepancies between the foregoing specification and the aforementioned corresponding German application are to be resolved in favor of the latter.

We claim:

1. Pretensionable and hydraulically damped mounting element with an outer mounting sleeve, an inner part, which is held by an elastomeric body in the interior of the outer mounting sleeve, the elastomeric body above and below the inner part being formed with chambers serving as a mechanical spring and being filled with hydraulic fluid and connected to one another via a channel, and end caps located at respective end faces of the mounting element and being formed of elastic, deformable elastomeric material, the elastomeric body extending from the inner part substantially radially outwardly towards opposite sides of the outer mounting sleeve, the elastomeric body and at least one of said end caps defining the channel therebetween, the channel having a variable cross section, comprising means defining axially extending additional chambers arranged at both sides of the inner part of the elastomer body, said additional chambers communicating with the channel.

* * * * *